United States Patent [19]

Neefe

[11] Patent Number: 4,725,133
[45] Date of Patent: * Feb. 16, 1988

[54] CORNEAL COLOR CHANGE DEVICE WITH WIDE FITTING LATITUDE

[76] Inventor: Charles W. Neefe, 811 Sunny St., P.O. Box 429, Big Spring, Tex. 79720

[*] Notice: The portion of the term of this patent subsequent to Oct. 7, 2003 has been disclaimed.

[21] Appl. No.: 785,278

[22] Filed: Oct. 7, 1985

[51] Int. Cl.⁴ .......................... G02C 7/04; A61K 9/22
[52] U.S. Cl. ...................................... 351/162; 424/429
[58] Field of Search ............... 351/160 R, 160 H, 161, 351/162; 604/895

[56] References Cited

U.S. PATENT DOCUMENTS 4,157,864  6/1979  Koller et al. ................... 351/160 H
4,615,593  10/1986  Neefe ................................ 351/162

Primary Examiner—John K. Corbin
Assistant Examiner—Scott J. Sugarman

[57] ABSTRACT

A soft flexible corneal device having a diameter smaller than the cornea and a central open pupil aperture substantially the size of the pupil of the eye. The device has a concave surface radius shorter than the convex corneal radius. The concave device center of curvature is positioned to allow the inner pupil device edge and the peripheral outer device edge to both be tangent to the corneal surface. The convex surface of the device has a radius of curvature shorter than the concave surface and is also tangent to both the inner pupil edge and the outer peripheral device edge. When placed on the cornea the concave surface of the soft flexible device assumes the convex curvature of the cornea.

11 Claims, 2 Drawing Figures

CORNEAL COLOR CHANGE DEVICE WITH WIDE FITTING LATITUDE

BACKGROUND OF THE INVENTION

The desire to change and enhance the apparent color of the eye was recorded by Egyptians five thousand years ago. Cosmetic makeup for the eye area accounts for the larger percentage of the cosmetic sales.

PRIOR ART

Several contact lenses have been produced in an effort to achieve cosmetic eye color change.

One attempt employed a laminated structure with a painted opaque plastic member. The result was a thick heavy lens which was difficult to fabricate and difficult to wear. A later attempt employed a colored opaque porous member surrounding a clear cylinder from which the lens was cut by lathing. This resulting in a lens having a pupil and iris pattern and the porous member had tendencies to flake and chip at the edge. (U.S. Pat. No. 3,454,332—Siegel). 1A third generation of colored lenses provided a thin layer of colored opaque markings placed in a clear material. The oqaque colored marking radiated from the center of the clear material in a geometric pattern.

U.S. Pat. Nos. to Neefe 4,472,327 and 4,460,523 both describe methods of making soft cosmetic corrective contact lenses that change a dark colored eye to a light blue, green or other desirable color.

It is commonly known that any transparent conventional colored contact lens placed on a dark colored iris has little or no effect toward changing the apparent color of the eye.

Present contact lenses are intended for persons requiring visual refractive correction to obtain good visual acuity.

The lenses are classed as medical devices for visual correction and are subject to premarket approval by the Food and Drug Administration. Cosmetic lenses are not intended for use by the large percentage of the population who do not need or want visual correction. The cosmetic enhancement of the eye color does not require a visual refractive correction.

The manufacture of plano or zero power contact lenses is most difficult and expensive. A solution has been found by an ocular device with central visual aperture. The visual aperture being from 4.0 milimeters to 7.0 milimeters in diameter surrounded by a circular colored soft material. The edges of the central aperture are tapered on the convex surface thereby thinning the corneal device around the central aperture. This thinning of the aperture edge is necessary to prevent the tear miniscus formed by surface tension at the aperture edge. The edge thinning also provides a comfortable device and minimum of foreign body sensation as the eyelid travels over the central opening during the blink.

The opening at the center to the atmosphere prevents hypoxia and the formation of corneal edema. The non-refraction open aperture corneal device can be tolerated for extended periods of time without the edema problems encountered with refractive contact lenses. The materials used are stronger and more durable since no consideration of oxygen permeability is required. The aperture device may be tinted by dying or by adding colorant to the liquid monomer before polymerization. The aperture non-refractive coloring device is made from any of the available soft lens materials. Materials which are translucent are useful as the central visual area is in an open aperture. The material surrounding the central hole must provide comfort and the desired color for cosmetic enhancement.

EXAMPLES OF THE COLORANTS

FD and C Green #6, Leeben Color Blue LA-589, Brown LS-595, Green 16128 and Violet LS-611 have been used.

The acid dyes, known as azo dyes, containing nitrogen to nitrogen bonds —N=N— may be used to practice the invention as may the dyes known as reactive dyes and the sulphur dyes. The sulphur dyes are fixed or made fast by removing the sodium sulphide which made the dye soluble. Reactive dyes require no special fixing step, only extraction of unreacted dye, as they react chemically with the material and are thus made permanent. The properties of dyes are well known to the art.

Pigments of many colors are available. Examples are Sunfast Violet, Sunfast Blue and Sunfast Green all made by Sun Chemical.

The fluorescent pigments Blue 39, Orange 33 and Red 35 made by Radient Color division of Ciba Geigy Corp. provide a unique coloring as the color originates within the device by fluorescence.

DESCRIPTION OF THE PREFERRED EMBODIMENTS

Examples of the Monomer Mixture (1)

Ethylene glycol monomethacrylate: 64.8%
Diethylene glycol monomethacrylate: 7.056%
Ethylene glycol dimethacrylate: 0.144%
Water: 20.9%
Ammonium Persulfate: 1.1%
2-dimethylaminoethyl acetate: 6.0%

(2)

Ethylene glycol monomethacrylate: 54.7%
Diethylene glycol monomethacrylate: 17.2%
Diethylene glycol dimethacrylate: 0.6%
Ammonium Persulfate: 1.1%
Dimethylaminoethyl acetate: 5.8%

Low water content hydrophilic materials having a water content of 25 to 40 percent water by weight have provided consistently fine results. Low water devices are strong, durable and they resist tearing.

It has been discovered that the conventional fitting techniques used for soft corrective contact lenses cannot be used with the aperture cosmetic devices. The same hydrophilic materials may be used however the fitting philosophy cannot be used.

In order to center around the pupil the aperture cosmetic device must have a shorter concave radius of curvature. Soft refractive contact lenses are fitted having a concave radius longer than the convex radius of the cornea. The corrective soft contact lenses are also fitted with a diameter larger than the cornea. If these parameters are used for the corneal aperture device, the device will not center around the pupil. The soft aperture cosmetic device is made having a diameter equal to or smaller than the cornea. In fitting the aperture device a diameter of from 10.0 milimeters to 12.5 milimeters has been found useful with a concave surface radius from 0.05 milimeter to 1.60 milimeters shorter than the cornea.

A corneal curvature of 48.00 diopters has a convex radius of 7.03 milimeters. An aperture cosmetic device having a minimum concave radius of 5.43 milimeters could be used.

A corneal curvature of 39.00 diopters has a convex radius of 8.65 milimeters therefore an aperture cosmetic device having a maximum concave radius of 8.60 could be used. The useful concave surface radii ranges from 5.43 milimeters to 8.60 milimeters.

The present cosmetic invention is not a lens as it has a hole or aperture in the center to provide uncorrected vision through the hole. Our people refer to it as the doughnut.

The Corneal Device Functions as Follows

Figure 1:
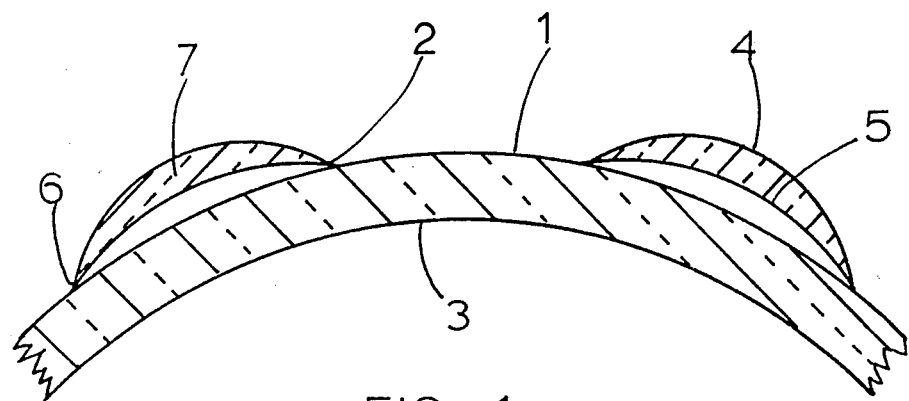
FIG. 1 shows the corneal device on the cornea in section.
Figure 2:
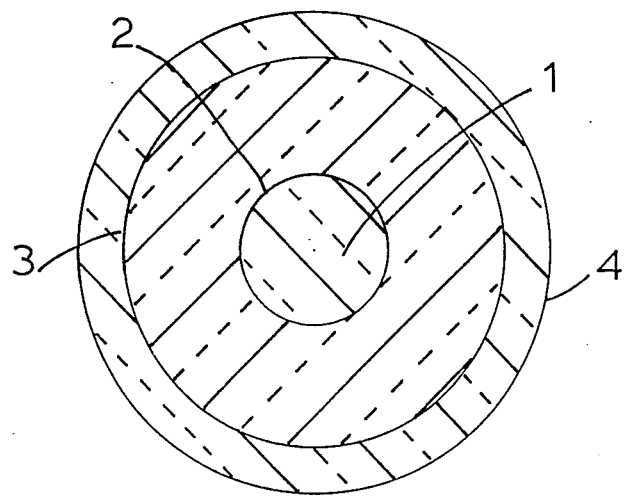
FIG. 2 shows the device on the cornea from the front.

Corneal device 7 FIG. 1 has a concave surface radius 5 FIG. 1 which is shorter than the convex corneal radius 1 FIG. 1 upon which the device is placed. The center of curvature of the concave radius 5 FIG. 1 is offset to enable the edges of the device 2 and 6 FIG. 1 to be in contact with the convex corneal surface 1 FIG. 1. The convex surface of the device 4 FIG. 1 has a radius of curvature shorter than the concave radius 5 FIG. 1. The convex radius 4 FIG. 1 is also offset to allow the convex curve 4 FIG. 1 to intersect the concave curvature 5 FIG. 1 at the inner and outer edges of the cornea device 6 and 2 FIG. 1. The concave inner surface of the cornea is shown as 3 FIG. 1. The corneal device 3 FIG. 2 centers on the cornea 4 FIG. 2 the central corneal surface 1 FIGS. 1 and 2 is exposed to the atmosphere. Oxygen is made available to the precorneal fluid and the cornea through the opening 2 FIG. 2. The outer edge of the corneal device 6 FIG. 1 and 3 FIG. 2 is located near the corneal limbus 4 FIG. 2.

When in place on the cornea the concave radius 5 FIG. 1 flattens and becomes equal to the corneal radius 1 FIG. 1. This flattening action is produced by pressure from the eye lids during the blink and maintained by capillary attraction. The sealing at points 2 and 6 FIG. 1 retards the entry of tears between blinks aids in maintaining a near parallel fit. This ability to flex and fit and retain the fit between blink provides a corneal device which is extremely comfortable and centers well around the pupil.

The corneal device is useful for the delivery of medication to the eye as only one size and curvature is required.

The corneal device is useful as an over-the-counter cosmetic to change the apparent color of the eye as only one size and curvature is required.

Antimicrobial agents may be added to the monomer before polymerization and locked into the polymeric structure of the lens. These agents prevent the growth of micro-organisms on the device surface and eliminate the need for disinfecting.

It should be understood that the invention is not limited to the exact details of construction shown and described herein for obvious modifications will occur to persons skilled in the art.

I claim:

1. A flexible corneal device that changes the apparent color of the eye by having a fluorescent pigment which radiates light from within the device and having a diameter equal to or smaller than the cornea and a central open aperture substantially the size of the pupil of the eye, and a concave surface radius shorter than the convex corneal radius and the concave center of curvature is positioned to allow the device concave surface to be tangent to the corneal surface at the edge of the inner open aperture and at the peripheral outer device edge and the convex surface of the flexible device has a radius of curvature shorter than the concave surface and tangent to both the edge of the inner open aperture and the outer peripheral edge, and when the corneal device is placed on the cornea of the eye the concave surface of the flexible corneal device assumes the curvature of the cornea.

2. The subject matter set forth in claim 1 wherein the device contains an antimicrobial agent.

3. A device as in claim 1 wherein the device is made from a hydrophilic material.

4. A device as in claim 1 wherein a color originates within the device by fluorescence.

5. A colored flexible cornea device that changes the apparent color of the eye having a diameter equal to or smaller than the cornea to which it is applied and a central open aperture substantially the size of the pupil of the eye, and a concave surface radius shorter than the corneal radius, the concave device center of curvature positioned to allow the inner open aperture device edge and the peripheral outer device edge to be tangent to the corneal surface, the convex surface of the device having a radius of curvature shorter than the concave surface and being tangent to both the inner open aperture edge and the outer peripheral edge, and when placed on the cornea of the eye the concave surface of the flexible corneal device assumes the curvature of the cornea.

6. The subject matter set forth in claim 5 wherein the device contains an antimicrobial agent.

7. A device as in claim 5 wherein the color is a fluorescent pigment.

8. A device as in claim 5 wherein the color is a dye.

9. A device as in claim 5 wherein the color is a dye and a fluorescent pigment.

10. A device as in claim 5 wherein the device is made from a hydrophilic material.

11. A device as in claim 5 wherein a color originates within the device by fluorescence.

* * * * *